(12) United States Patent
McClure et al.

(10) Patent No.: US 6,550,218 B2
(45) Date of Patent: Apr. 22, 2003

(54) OVER THE EDGE NET WRAP DISPENSING SYSTEM FOR A ROUND BALER

(75) Inventors: John R. McClure, New Holland, PA (US); John H. Merritt, New Holland, PA (US); Kenneth R. Underhill, Strasburg, PA (US)

(73) Assignee: New Holland North America, Inc., New Holland, PA (US)

( * ) Notice: Subject to any disclaimer, the term of this patent is extended or adjusted under 35 U.S.C. 154(b) by 125 days.

(21) Appl. No.: 09/878,039

(22) Filed: Jun. 8, 2001

(65) Prior Publication Data

US 2002/0184861 A1 Dec. 12, 2002

(51) Int. Cl.$^7$ .......................... B65B 63/04; A01F 15/07
(52) U.S. Cl. .............................. 53/118; 53/556; 53/587; 56/341
(58) Field of Search .......................... 53/118, 556, 587, 53/211, 215, 389.4; 56/341; 206/83.5

(56) References Cited

U.S. PATENT DOCUMENTS

| | | | |
|---|---|---|---|
| 3,875,723 A | * 4/1975 | Sundin | ......................... 53/211 |
| 4,137,690 A | * 2/1979 | Morgan | ......................... 53/211 |
| 4,144,696 A | * 3/1979 | Gustavsson | .................. 53/587 |
| 4,366,665 A | 1/1983 | VanGinhoven et al. | |
| 4,790,125 A | 12/1988 | Merritt, III | |
| 4,917,008 A | 4/1990 | van den Wildenberg | |
| 4,969,315 A | 11/1990 | Ardueser et al. | |
| 5,090,182 A | 2/1992 | Bethge | |
| 5,103,621 A | 4/1992 | Matsumoto | |
| 5,174,095 A | * 12/1992 | Fujiwara et al. | ............... 53/211 |
| 5,230,193 A | 7/1993 | Underhill et al. | |
| 5,243,806 A | 9/1993 | Jennings et al. | |
| 5,311,729 A | 5/1994 | Viaud | |
| 5,581,973 A | * 12/1996 | Underhill | ...................... 53/118 |
| 6,006,504 A | 12/1999 | Myers et al. | |

* cited by examiner

Primary Examiner—Stephen F. Gerrity
(74) Attorney, Agent, or Firm—John William Stader

(57) ABSTRACT

The device consists of a mechanism to place netwrap over the edge of a cylindrical bale that is created in a variable/fixed baling chamber of an agricultural round baler. The invention consists of a netwrap delivery system having of a pair of arms pivotally affixed to the outside of the baling chamber sidewalls. Also attached to the arms is an assembly frame. An actuator controls the pivoting motion of the delivery system inserting the netwrap between the stationary dimple roll and the pivot roll of the sledge assembly. Positioned outside the sidewall and between the outer frame member is a transition area. The netwrap is inserted between the stationary dimple roll and the pivot roll as well as into the transition area. Because the width of the delivery assembly is wider than that of the cylindrical bale, a portion of the netwrap is inserted over the edge by use of the transition area.

15 Claims, 7 Drawing Sheets

OVER THE EDGE NET WRAP DISPENSING SYSTEM FOR A ROUND BALER

FIELD OF THE INVENTION

This invention relates to the improvement of an agricultural round baler. More specifically it relates to an improvement to the net wrap dispensing system that allows net wrap to be placed over the edge of a round bale.

BACKGROUND OF THE INVENTION

Agricultural round balers have been used for several decades to collect and bind crop material so as to facilitate the storage of crop material for later use. Generally, a mower or mower-conditioner cuts the crop and arranges it in a windrow for drying. A general example of a disc mower-conditioner is the New Holland Discbine® disc mower conditioner model 1431 manufactured by New Holland North America, Inc. Later, an agricultural tractor pulls a baler over the windrow to collect the crop material. The baler's windrow pickup gathers the cut and windrowed crop and lifts it into the baling chamber. The baling chamber consists of a pair of opposing sidewalls with a series of belts that rotate and compress the crop material into a cylindrically shaped bale. When the bale has achieved a desired size and density, the operator wraps the bale to ensure that the cylindrical and compact nature of the bale is maintained. There are many wrapping materials and methods of wrapping the bale depending on a variety of factors. Initially, twine was used to wrap the bale. Later netwrap and silage sheets were introduced. Generally, these methods focused on covering the cylindrical portion of the bale and not the ends. After the bale is bound or wrapped, it is ejected from the baler for later pickup by the farmer.

As previously mentioned, there are a variety of agricultural round balers. A general example of this device is illustrated by the New Holland Roll-Belt™ Round Baler model number 678 manufactured by New Holland North America, Inc. Generally, round balers are pulled by an agricultural tractor and receive rotational power from the tractor's power-take-off shaft positioned at the rear of the tractor. The energy is transmitted to a gearbox positioned on the baler. Some balers also use a hydraulic motor and pump arrangement to provide energy to the various baler elements such as the various rollers and belts. As previously discussed, a variety of methods are used to wrap the bale. Relatively recently, the use of netting or netwrap has been introduced. It is desirable for bales to maintain a cylindrical shape, however this has been especially difficult near the edge of the cylindrical bale. It is difficult for twine to remain on the edge of the bale as well as mechanically placing the twine in that position. Recently attempts have been made to extend a portion of the netwrap around the edge of the round bale. By allowing a slight portion of the netwrap to extend over the edge of the bale, the appearance of the round bale is improved. Furthermore, the bale is afforded additional protection. These methods have not been entirely successful as the prior art illustrates various deficiencies.

U.S. Pat. Nos. 5,230,193 and 5,243,806 illustrate a conventional fixed/variable hybrid baling chamber. To ensure that the core of the round bale is well defined, a sledge assembly is initially used to compress the crop material. As more crop material is introduced into the baling chamber, the apron of belts is loosened allowing more material to enter the baling chamber. The crop material remains compressed and in a cylindrical shape because of the interaction between the sledge assembly and belt apron. While this approach allows for the creation of a superior shaped and dense round bale, there are greater complications when encircling the bale with the netwrap material. Specially, the netwrap needs to be timed to enter the confines of the baling chamber through the sledge assembly and without interfering with operation of the apron of belts.

U.S. Pat. Nos. 4,366,665, 4,709,125, 4,969,315, 5,090,182 and 5,103,621 and 5,311,729 illustrate various designs for wrapping round bales with either netwrap or silage wrap. Typically, the wrap only covers the cylindrical portion of the of the round bale and not the ends. Usually, the wrap is spread to cover the length of the cylindrical portion of the round bale by a series of idler and spreader rolls. The wrapping material is kept on a roll at a single location for dispensing.

U.S. Pat. Nos. 4,917,008, and 6,006,504 illustrate attempts to extend netwrap over the edge of the cylindrical bale, but on variable sized bale chambers. The baling chambers on these balers are less complex and do not form crop material into cylindrical bale as effectively as a variable/fixed hybrid baling chamber. This is reflected in the simplistic design of the netwrap delivery assemblies. U.S. Pat. No. 6,006,504 uses a pair of guide plates to compress the ends of the bale so as to be able to insert netwrap around the edge of the bale from the rear tailgate. The addition of the guide plates to compress the bale causes additional stresses to the sides of the baling chamber and could also distort the appearance and shape of the bale. U.S. Pat. No. 4,917,008 uses a netwrap that contains an elastic material to wrap around the edge of the cylindrical bale.

Consequently, the need exists for an improved netwrap delivery assembly for use on an variable/fixed baling chamber that permits the netwrap to extend around the edge of the cylindrical bale.

OBJECTS OF THE INVENTION

It is an object of the present invention to provide a netwrap delivery system which can insert netwrap over the edge of a cylindrical bale.

It is a further object of the present invention to provide a netwrap delivery system that can operate on a fixed/variable hybrid baling chamber.

It is a further object of the present invention to provide a netwrap delivery system that can insert netwrap over the edge of the cylindrical bale without compressing the sides of the cylindrical bale.

It is a further object of the present invention to provide a netwrap delivery system that can insert netwrap onto the edge of the cylindrical bale through the sledge assembly of a fixed/variable hybrid baling chamber.

It is a further object of the present invention to provide a netwrap delivery system that may be affixed to the sides of the baling chamber instead of the sledge assembly.

It is a further object of the present invention to provide a netwrap delivery system that will allow net wrap material to be place over the edge of a cylindrical bale permitting good bale appearance.

SUMMARY OF THE INVENTION

The invention overcomes the deficiencies of the prior art. The invention is an improvement to the mechanism to place netwrap over the edge of a cylindrical bale that is created in a variable/fixed baling chamber of an agricultural round baler. The invention consists of a netwrap delivery system having of a pair of arms pivotally affixed to the outside of the baling chamber sidewalls. Also attached to the arms is an assembly frame. An actuator controls the pivoting motion of the delivery system inserting the netwrap between the stationary dimple roll and the pivot roll of the sledge assembly. Positioned outside the sidewall and between the outer frame member is a transition area. The netwrap is inserted between the stationary dimple roll and the pivot roll as well as into the transition area. Because the width of the delivery assembly is wider than that of the cylindrical bale, a portion of the netwrap is inserted over the edge of the cylindrical bale by use of the transition area.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
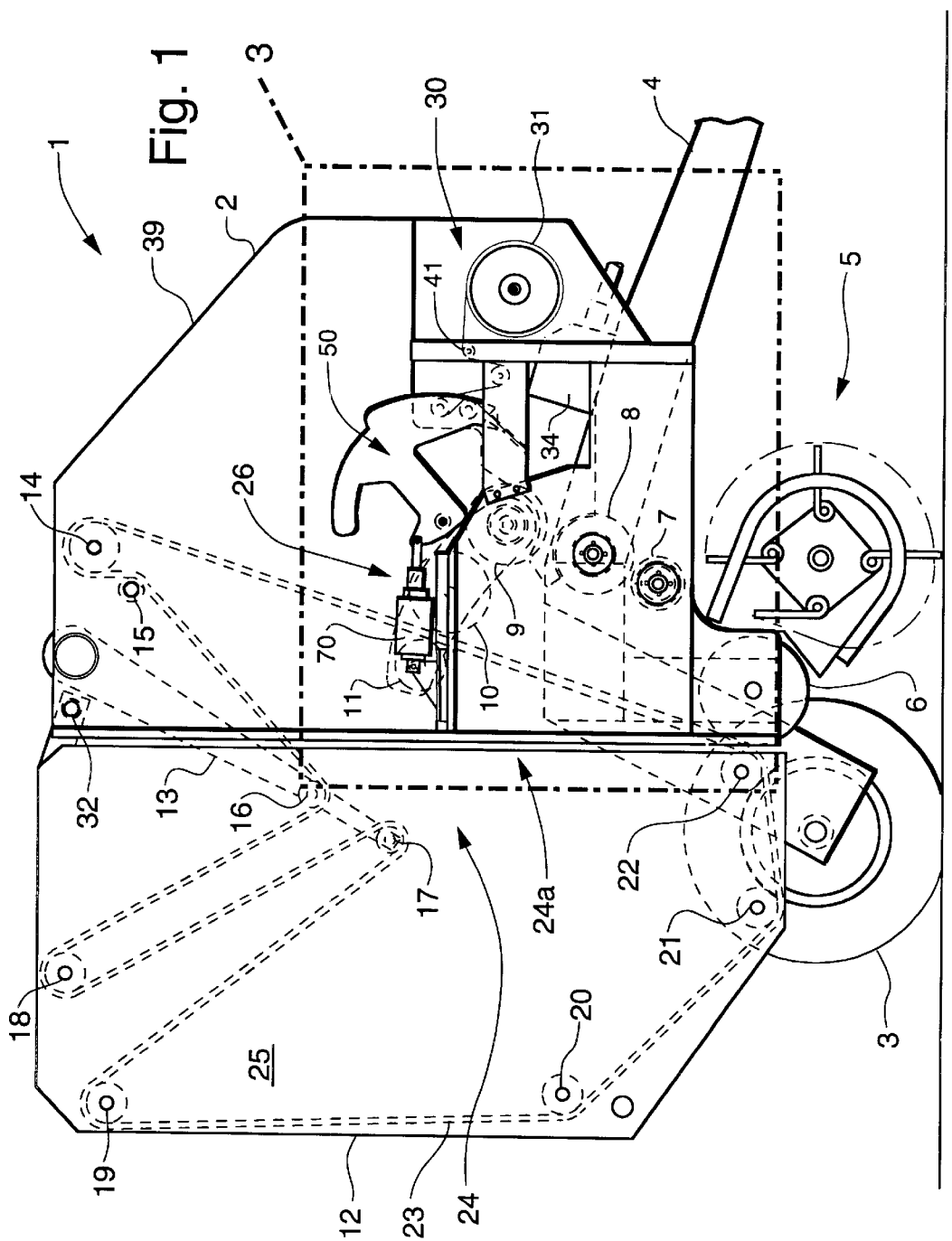
FIG. 1 is a side elevation of a round baler with parts in position to begin picking up crop material to from a cylindrical bale.

Referring to the drawings, it is possible to observe the major elements and general operation of the present invention. Left and right references are used as a matter of convenience and are determined by standing at the rear of the round baler and facing the forward end in the normal direction of travel. Likewise, forward and rearward are determined by normal direction of travel of the tractor or round baler. Upward or downward orientations are relative to the ground or operating surface. Horizontal or vertical planes are also relative to ground.

FIG. 1 illustrates a conventional round baler 1 with the baling chamber 24a ready to receive crop material. The round baler 1 is attached to a tractor (not shown) by means of a tongue 4. Rotational power from the tractor's power-take-off shaft (not shown) is transmitted to a gearbox 34 via a drive shaft. This is the source of power to operate the round baler. It is also possible that a hydraulic motor and pump arrangement may be used.

The round baler 1 has a main frame 2 supported by a pair of tires (only one shown) 3. A pickup 5 is positioned in front of the tires 3. The baling chamber 24a is defined by a pair of opposing baling chamber sidewalls 24 and a series of rubber belts defining an apron 23. Further defining the bale chamber 24a is the floor roll 6, starter roll 7 and stationary dimple roll 8 and a sledge assembly 26. The baling chamber 24a has tailgate 12 that pivots about the tailgate pivot 32 to separate the tailgate 12 from the front portion 39 of the baler 1.

The series of rubber belts or apron 23 encircle the sledge follower roll 11, drive roll 14, backwrap roll 15, front serpentine roll 16, rear serpentine roll 17, top/front tailgate idler roll 18, top/rear tailgate idler roll middle tailgate idler roll 19, middle tailgate idler roll 20, bottom tailgate idler roll 21 and nose roll 22. The length of the apron 23 is adjusted by a pivoting serpentine take up arm 13. The serpentine take up arm 13 rotates clock wise (as seen in FIG. 1 when the chamber 24a is empty and then in FIG. 2 when the chamber 24a is full) as the crop material enters the bale chamber 23 and increases the length of the apron 23 as the size of the bale increases.

Generally, the tractor pulls the baler 1 over the a windrow of previously cut crop. The pickup 5 inserts the crop between the floor roll 6 and starter roll 7 into the baling chamber 24a. As more crop material enters the bale chamber 24a, the serpentine take up arm 14 and sledge assembly 26 rotate clockwise (as viewed in FIGS. 1 and 2) to allow additional crop material to enter the chamber 24a while ensuring that proper pressure is maintained on the bale. When the bale chamber 24a is full, the bale wrapping system 30 engages and wraps the bale. Once the bale is wrapped, the tailgate 12 raises and ejects the bale from the bale chamber 24a and away from the round baler 1 and tractor.

The bale wrapping system 30 of the present invention consists of a system for placing netwrap 41 onto a netwrap delivery assembly 50. The netwrap delivery assembly 50 places the netwrap 41 onto the cylindrical portion 36 of the bale and over the edge 38 of the bale so as to cover a portion of each end 37 of the bale (see FIG. 8). The netwrap 41 is stored on a netwrap roll 31 and is dispensed to a netwrap delivery assembly 50. The assembly 50 is rotated about a pivot 55 and controlled by an actuator 70.

The netwrap delivery assembly 50 has a pair of arms 51 positioned outside of the baling chamber sidewalls 24. The arms 51 are attached by a pivot 55 on the sidewalls 24. Connecting the arms 51 is the assembly frame 54. The assembly frame 54 has an upper baffle 53a and a lower baffle 53b. There are also a pair of netwrap spreader rolls 52 or similar netwrap spreading mechanism extending between the arms 51. Attached to one of the arms 51 is the actuator 70 that rotates the netwrap delivery assembly 50. Netwrap 41 is provided from the netwrap roll 31 and passes over an idler roll 43 and roller 42.

Figure 5:
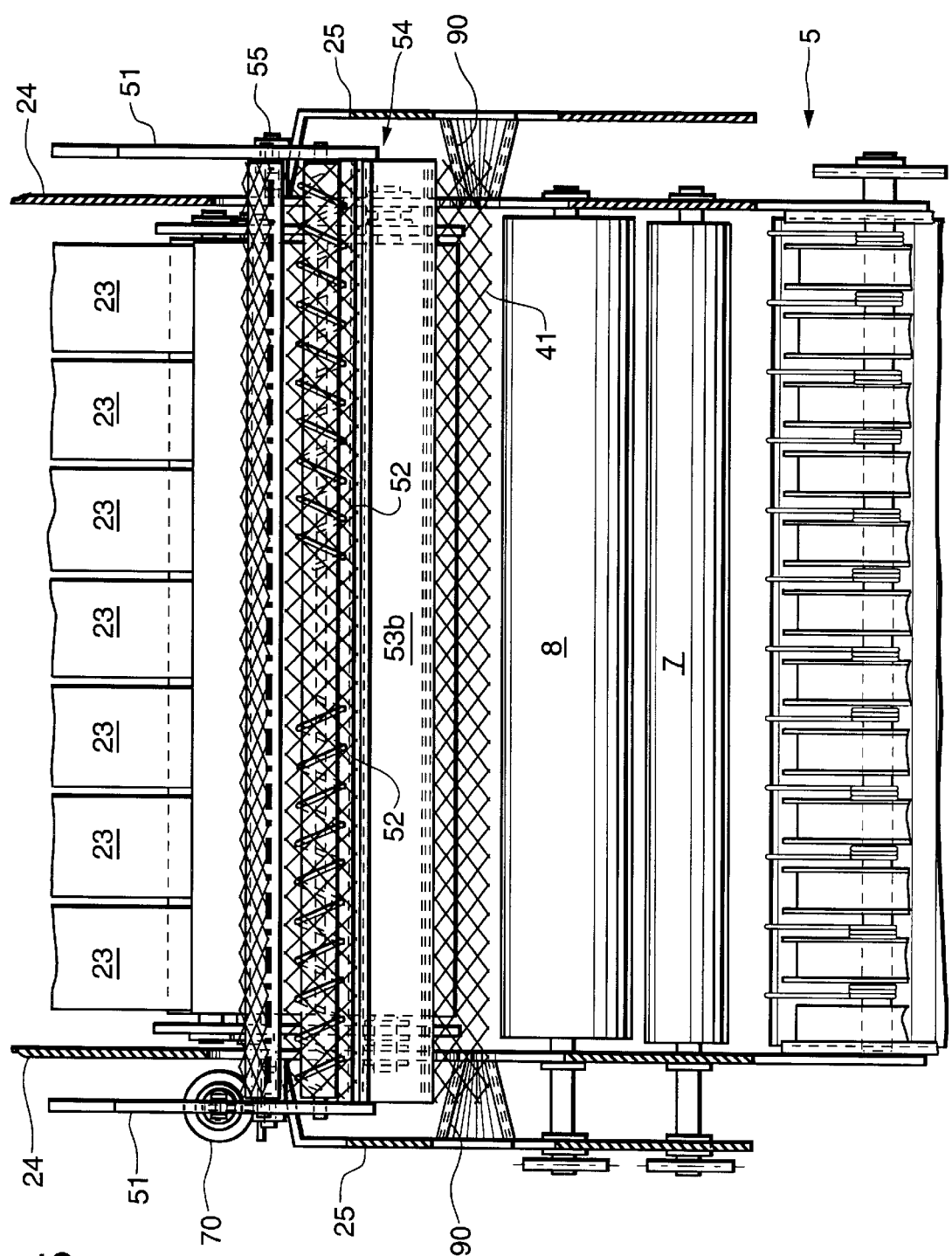
FIG. 5 is a section taken on the line 5-5 of FIG. 3.
Figure 6:
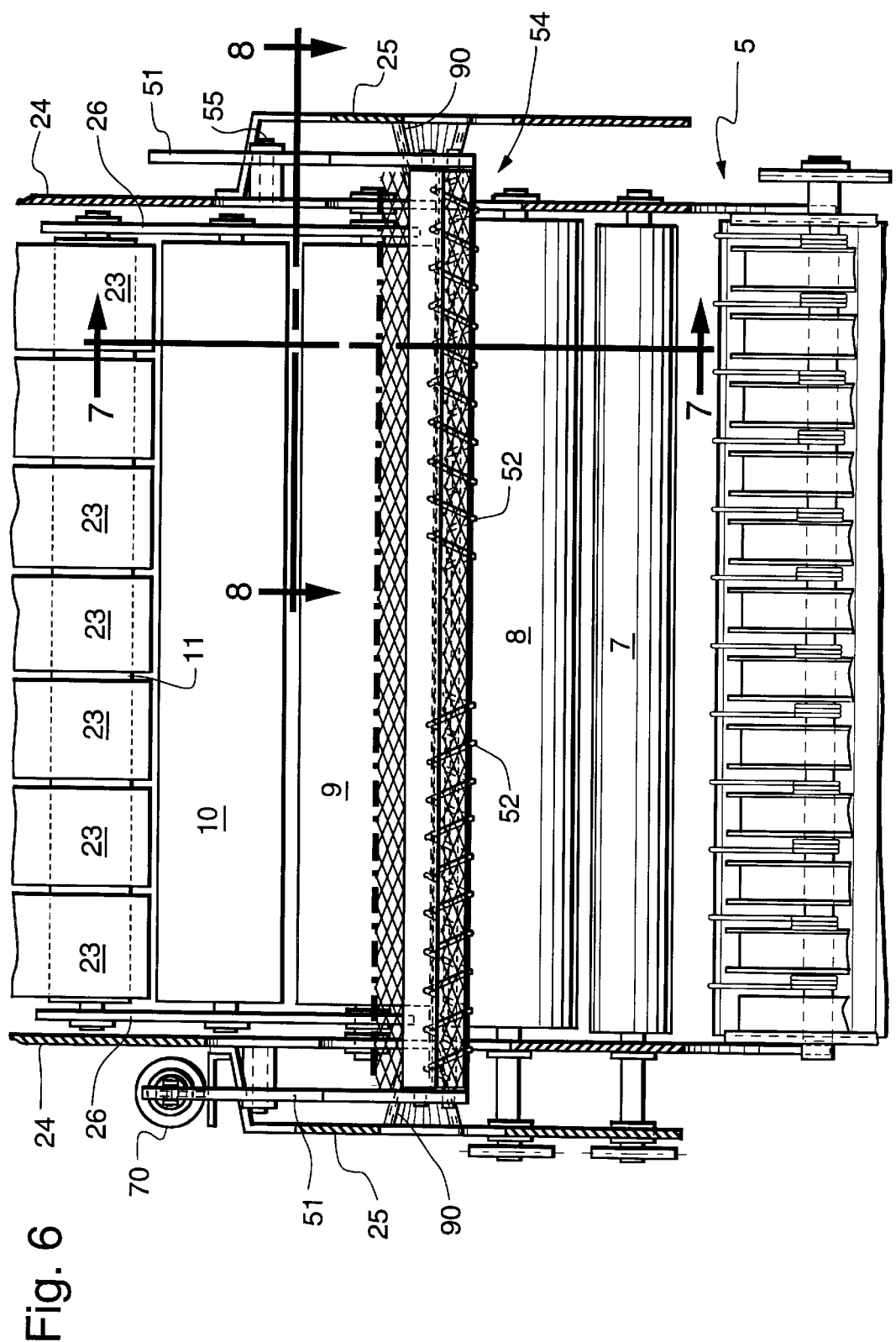
FIG. 6 is a section taken on the line 6-6 of FIG. 4.
Figure 8:
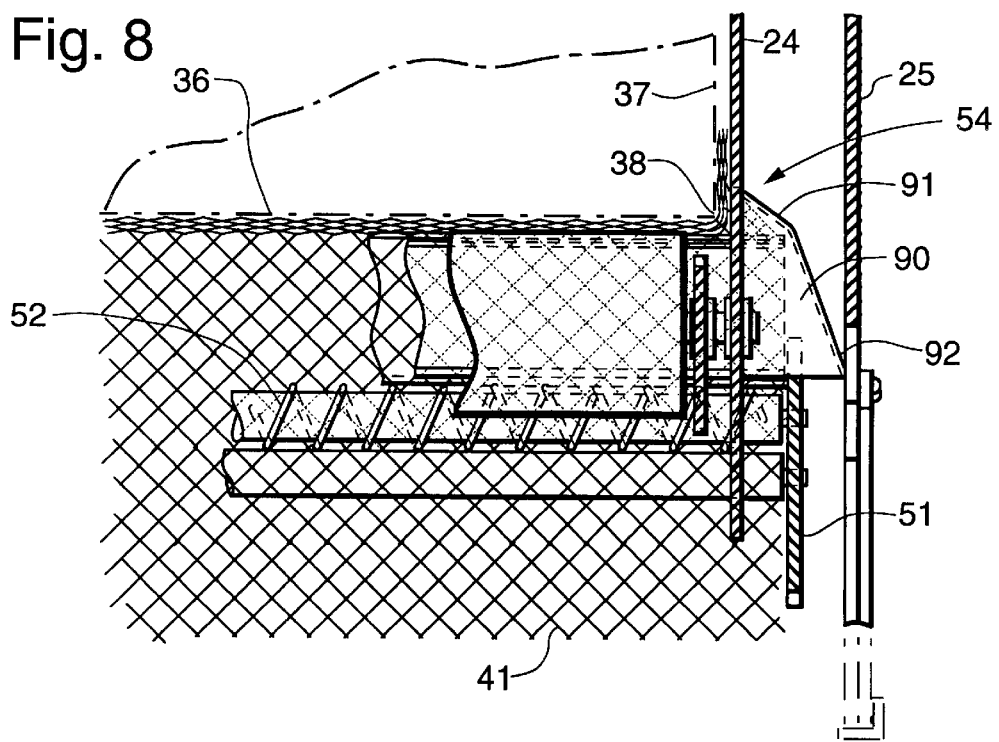
FIG. 8 is a horizontal section taken on the line 8-8 of FIG. 6.

As seen in FIGS. 5, 6 and 8, positioned between baling chamber sidewall 24 and the outer frame member 25 are a pair of transition areas 90. As viewed overhead in FIG. 8, each transition area 90 has a first tapered area 91 and second tapered area 92. The second tapered area 92 extends from the outer frame member 25 towards the baling chamber sidewall 24. The first tapered area 91 extends from the second tapered area 92 and extends through the baling chamber sidewall 24.

Figure 2:
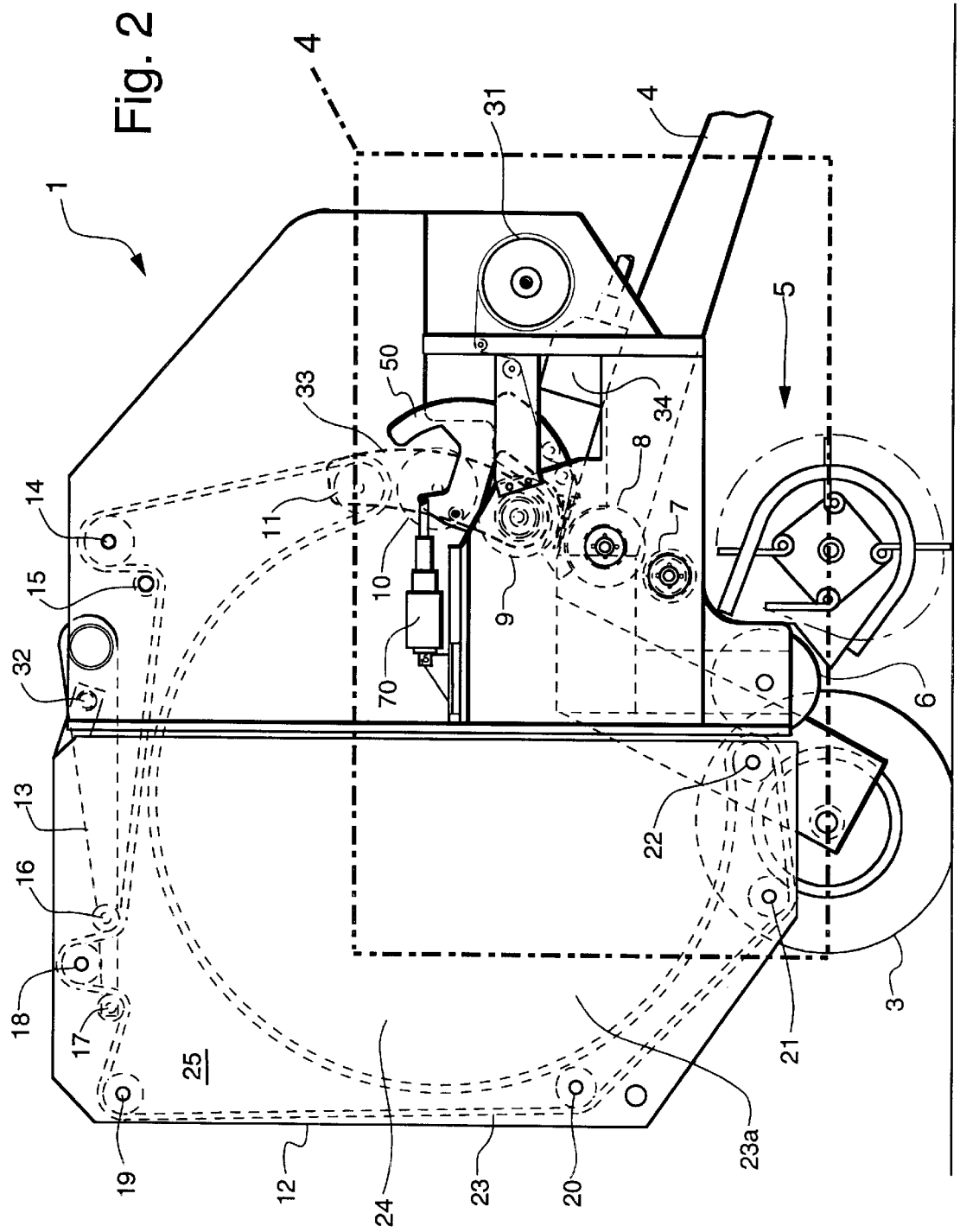
FIG. 2 is a view similar to FIG. 1, but with parts shown in position to begin wrapping net around a completed cylindrical bale.
Figure 3:
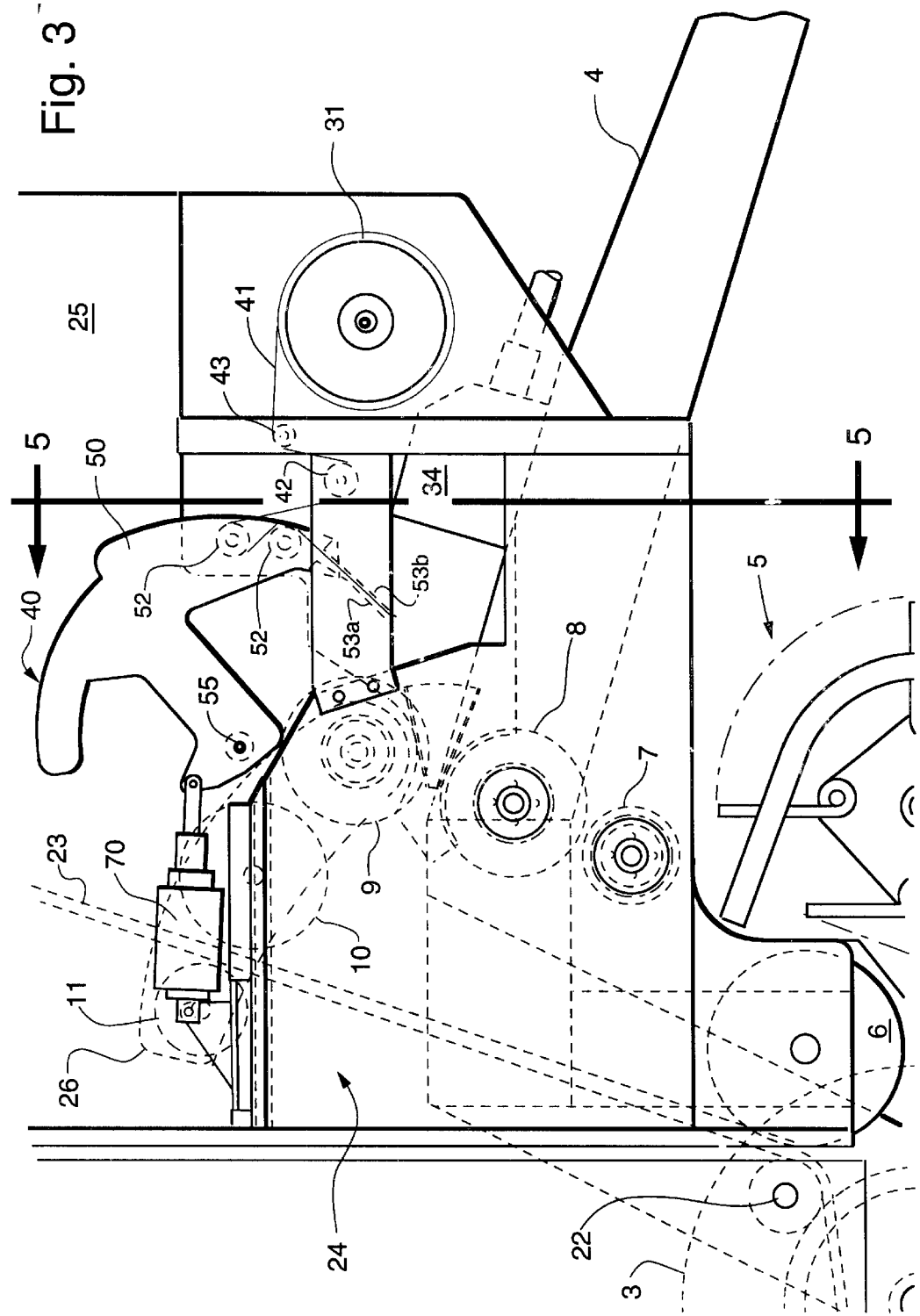
FIG. 3 is an enlarged elevation of the area of "3" of FIG. 1 to better show the parts relating to the present invention.
Figure 4:
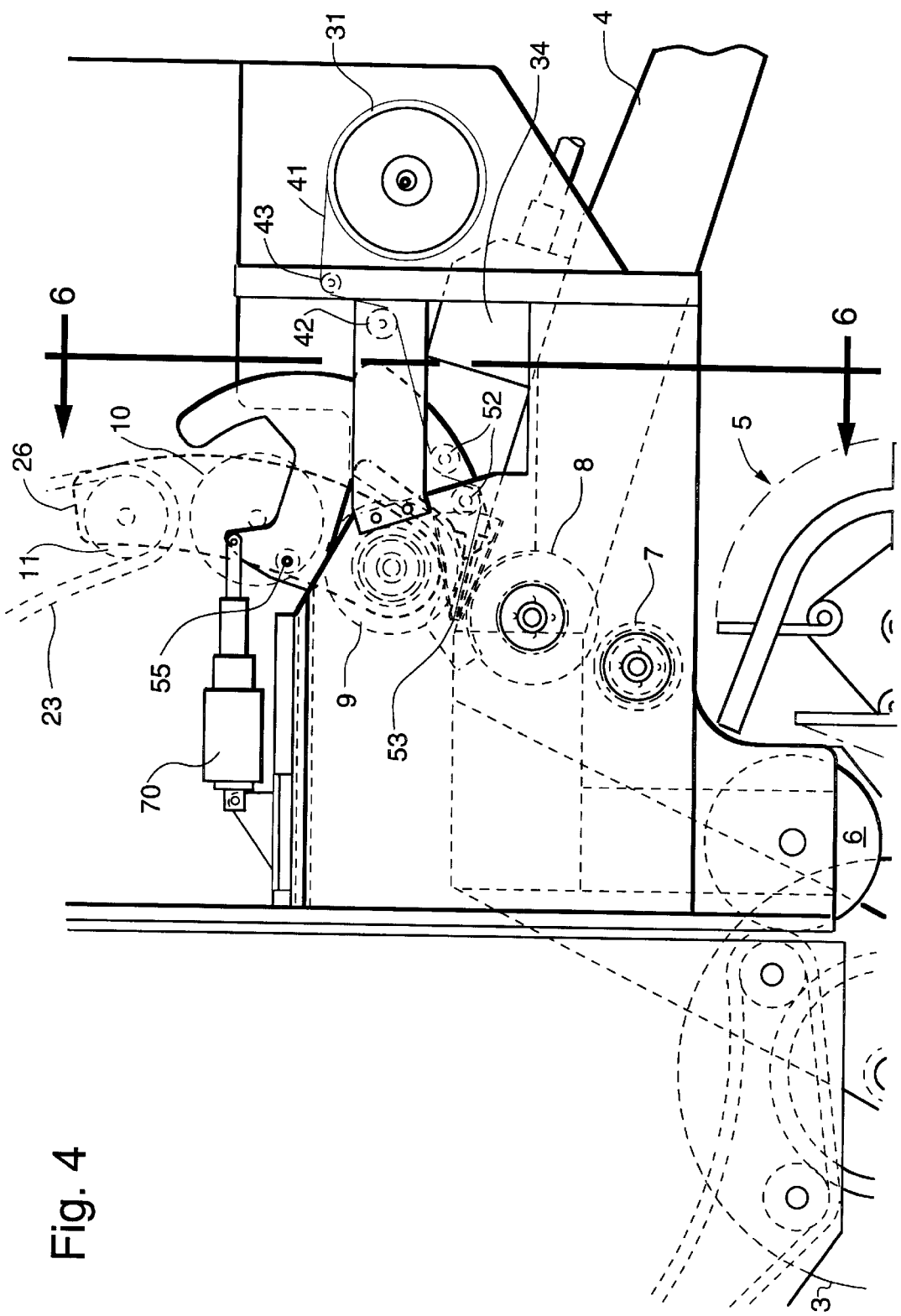
FIG. 4 is an enlarged elevation of the area "4" of FIG. 2 showing the parts of the present invention in net wrapping position.
Figure 7:
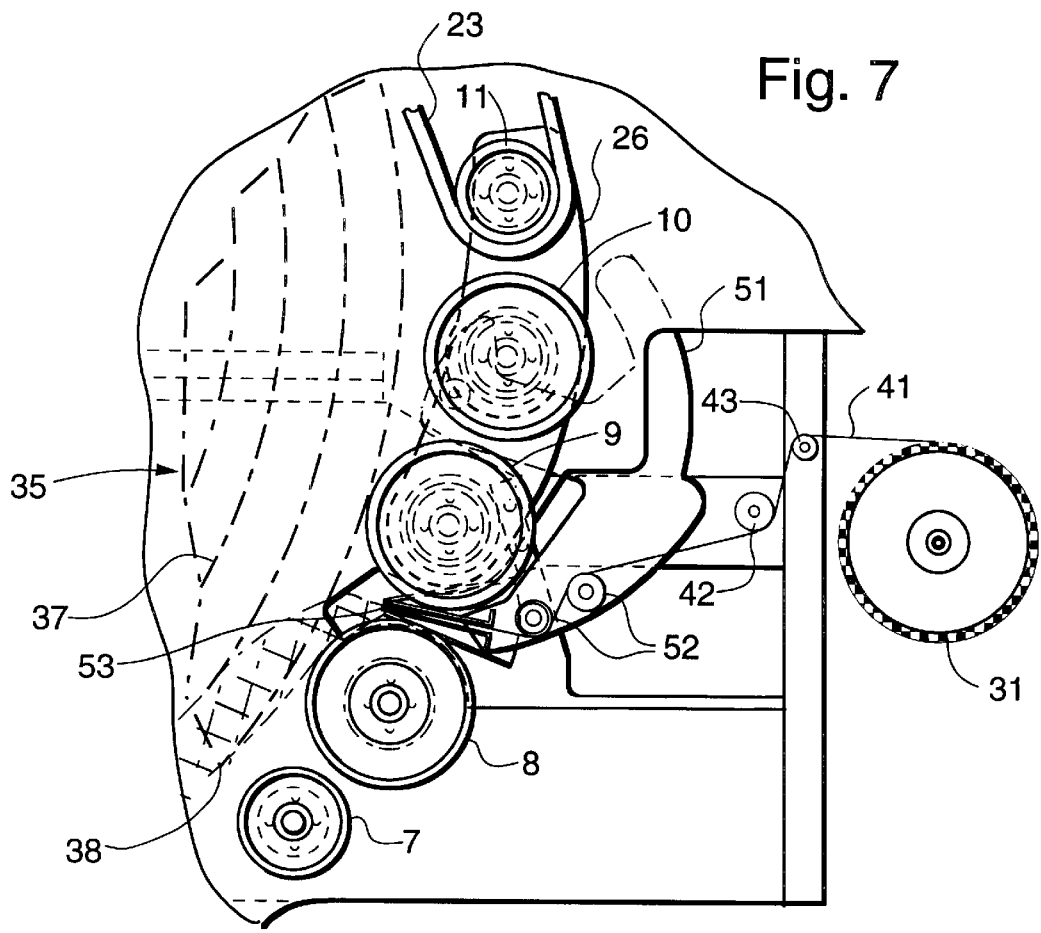
FIG. 7 is a vertical section taken on the line 7-7 of FIG. 6.

In the start of a typical baling operation, as seen in FIGS. 1 and 3, the netwrap delivery assembly is withdrawn and held in its retracted position. When sufficient crop material has entered the baling chamber 24a (as seen in FIG. 2), the actuator 70 is extended, rotating the netwrap delivery assembly 50 so that the upper baffle 53a and lower baffle 53b are inserted between the stationary dimple roll 8 and the pivot roll 9. This may be seen in FIGS. 4 and 7. Netwrap 41 is provided by the netwrap roll 31 over the idler roll 43 and roller 42. Next the netwrap 41 is spread by the spreader rolls 52 and is inserted between the upper baffle 53a and lower baffle 53b. It should be noted that the netwrap roll 31, netwrap 41, roller 42, idler roll 43, netwrap spread rolls 52 and assembly frame 54 are wider that the width of the baling chamber sidewalls 24 and consequently the cylindrical side 36 of the bale. To allow the netwrap 41 to extend over the bale's edge 38 and onto the bale's end 37, netwrap 41 is inserted into the transition area 90 by the netwrap delivery assembly 50. The netwrap 41 enters the second tapered area 92 and then the first tapered area 91. From the first tapered area 91 the netwrap moves through an opening in the bale chamber sidewall 24 and onto the end 37 of the cylindrical bale. Once sufficient netwrap 41 covers the bale 36 and bale end 37, the actuator 70 retracts the netwrap delivery system and the netwrap is cut.

It will be obvious to those skilled in the art that various changes may be made without departing from the scope of the invention and the invention is not to be considered limited to what is illustrated in the drawings and described in the specification.

What is claimed is:

1. An agricultural round baler comprising:
   a. a main frame having an outer frame member;
   b. a baling chamber supported by the main frame, the chamber having a pair of opposing baling chamber sidewalls, an apon positioned between the sidewalls, a pivot roll rotationally affixed to the sidewall and a stationary dimple roll rotationally affixed to the sidewall;
   c. a cylindrical bale positioned between the baling chamber sidewalls, the bale having a cylindrical portion and a pair of opposing ends; and
   d. a bale wrapping system pivotally affixed to the baling chamber sidewalls, said system having a means for inserting a quantity of netwrap between the pivot roll and the stationary dimple roll and for encircling the cylindrical portion with a quantity of netwrap and said system having the means of for encircling an edge of the bale.

2. The baler described in claim 1, further comprising a front portion supported by the main frame and a tailgate pivotally attached to the front portion, the bale wrapping system pivotally affixed to the front portion.

3. The baler described in claim 2, further comprising a sledge assembly pivotally attached to the pivot roll, the assembly having a stripper roll rotationally affixed to the sledge assembly and a sledge follower roll rotationally affixed to the sledge assembly.

4. The baler described in claim 3, wherein said means for inserting a quantity of netwrap further comprising:
   a. a netwrap delivery assembly; and
   b. a transition area positioned between the baling chamber sidewall and the outer frame member.

5. The baler described in claim 4, wherein the netwrap delivery assembly further comprises:
   a. a pair of arms pivotally attached to the sidewall;
   b. an assembly frame affixed between the arms; and;
   c. an upper baffle and a lower baffle affixed to the assembly frame for receiving a quantity of netwrap.

6. The baler described in claim 5, wherein the netwrap delivery assembly further comprising an actuator for rotating the upper baffle and lower baffle into proximate contact with the cylindrical bale by inserting the upper baffle and lower baffle between the pivot roll and stationary dimple roll.

7. The baler described in claim 6 wherein the transition area further comprises:
   a. a first tapered region allowing contact into the bale chamber; and
   b. a second tapered region proximate to the first tapered region, whereby a quantity of netwrap is inserted into the second tapered region through the upper and lower baffles, the netwrap passes through the first tapered region and onto the edge of the cylindrical bale.

8. The baler described in claim 7, wherein the netwrap delivery assembly further comprises:
   a. a netwrap spread roll rotationally affixed between the arms;
   b. a netwrap roll rotationally affixed to the outer frame member, the netwrap roll having the quantity of netwrap, thereon; and
   c. an idler roller and a roller rotationally affixed to the outer frame member, whereby the quantity of netwrap passes over the idler roller and roller onto the spread roller and into the upper and lower baffles.

9. The baler described in claim 8, wherein the upper baffle and lower baffle have a length greater than a width of the cylindrical bale.

10. In an agricultural round baler connected to an agricultural tractor by a tongue said tongue coupled to a main frame, the frame supported by a pair of tires, a front portion supported by the main frame, a tailgate pivotally attached to the front portion, a baling chamber for a cylindrical bale, the chamber having a pair of opposing baling chamber sidewalls, a pair of opposing outer frame members positioned outside of the sidewalls, an apron positioned between the sidewalls, a floor roll rotationally affixed to the sidewall, a stationary dimple roll rotationally affixed to the sidewall, a pivot roll rotationally affixed to the sidewall, a sledge assembly pivotally attached to the pivot roll, a pickup for inserting a quantity of a crop material into the baling chamber, a netwrap roll rotationally affixed to the main frame, the roll having a quantity of netwrap, thereon, the improvement comprising a bale wrapping system rotationally affixed to the sidewall, further comprising:
   a. a means for inserting the quantity of netwrap between the pivot roll and stationary dimple roll and for encircling the cylindrical bale and a means for encircling an edge of the bale; and
   b. a transition area positioned between the outer frame member and the bale chamber sidewall.

11. The improvement described in claim 10, wherein said transition area further comprises:
   a. a first tapered region allowing contact into the bale chamber; and
   b. a second tapered region proximate to the first tapered region, whereby the quantity of netwrap is inserted into the second tapered region, the netwrap passes through the first tapered region and onto the edge of the cylindrical bale.

12. The improvement described in claim 11, wherein the means for inserting the quantity of netwrap between the pivot roll and stationary dimple roll and for encircling the edge of the bale comprises a netwrap delivery assembly, said assembly further comprising:
   a. a pair of arms pivotally attached to the sidewall;
   b. an assembly frame affixed between the arms; and;
   c. an upper baffle and a lower baffle affixed to the assembly frame for receiving a quantity of netwrap.

13. The improvement in claim 12, wherein the netwrap delivery assembly further comprising an actuator for rotating the upper baffle and lower baffle into proximate contact with the cylindrical bale by inserting the upper baffle and lower baffle between the pivot roll and stationary dimple roll.

14. The improvement in claim 13, wherein the netwrap delivery assembly further comprises:

a. a netwrap spread roll rotationally affixed between the arms;

b. a netwrap roll rotationally affixed to the outer frame member, the netwrap roll having the quantity of netwrap, thereon; and c. an idler roller and a roller rotationally affixed to the outer frame member, whereby the quantity of netwrap passes over the idler roller and roller onto the spread roller and into the upper and lower baffles.

15. The improvement in claim 14 further comprising, wherein the upper baffle and lower baffle have a length greater than a width of the cylindrical bale.

* * * * *